United States Patent [19]

Mori et al.

[11] 4,275,344

[45] Jun. 23, 1981

[54] VOLTAGE CONTROL APPARATUS FOR ELECTRIC GENERATORS FOR VEHICLES

[75] Inventors: Kazumasa Mori, Aichi; Taro Asahi, Chiryu; Keiichiro Banzai, Toyota; Katsutaro Iwaki, Chiryu; Katsuya Muto, Kariya; Akira Mase, Handa; Takayasu Nimura, Nagoya; Katsumi Itoh, Oobu; Yoshio Akita, Ichinomiya, all of Japan

[73] Assignee: Nippondenso Co., Ltd., Kariya, Japan

[21] Appl. No.: 73,243

[22] Filed: Sep. 6, 1979

[30] Foreign Application Priority Data

Sep. 8, 1978 [JP] Japan .................................. 53-110874

[51] Int. Cl.³ .............................................. H02P 9/30
[52] U.S. Cl. ........................................ 322/28; 322/60; 322/73; 361/21; 320/64
[58] Field of Search ....................... 322/28, 59, 61, 60, 322/69, 70, 99, 72, 73; 320/61, 62, 64; 361/20, 21

[56] References Cited

U.S. PATENT DOCUMENTS

| 3,599,080 | 8/1971 | Bennett ................................. 322/60 |
| 3,820,009 | 6/1974 | Itoh et al. ............................. 322/28 |
| 3,984,755 | 10/1976 | Lehnhoff et al. ...................... 322/32 |
| 4,044,296 | 8/1977 | Dhyanchand et al. ................. 322/20 |

Primary Examiner—J. V. Truhe
Assistant Examiner—John W. Redman
Attorney, Agent, or Firm—Cushman, Darby & Cushman

[57] ABSTRACT

In a voltage control apparatus for an electric generator (1) for vehicles including an armature winding (3), an exciting coil (4), a rectifier (2) for rectifying an a.c. output from the armature winding, and a voltage regulator (5), the voltage regulator comprises a differential amplifier circuit (26) producing a detected voltage corresponding to a difference between a battery charging voltage and a reference voltage, a comparator circuit (30) comparing the detected voltage with a triangular waveform voltage generated at constant periods and producing a pulsed output voltage, a first driver circuit (51) effecting duty-factor-control of an exciting current flowing through the exciting coil in response to the pulsed output voltage, and an initial excitation circuit (32) for causing a predetermined small initial exciting current to flow through the exciting coil intermittently during a time interval after the start of the electric generator.

11 Claims, 10 Drawing Figures

VOLTAGE CONTROL APPARATUS FOR ELECTRIC GENERATORS FOR VEHICLES

This invention relates to a voltage control apparatus for electric generators for vehicles each of which electric generators comprises an exciting coil. Especially, this invention relates to a voltage control apparatus which enables suitable initial excitation and makes an initial excitation resistor unnecessary and which also enables high precision voltage control by performing a voltage detecting operation always at predetermined periods and effecting suitable duty factor control of an exciting current Generally, conventional voltage control apparatuses for electric generators for vehicles have a construction such that one desired value for a voltage to be regulated (hereinafter abbreviated as "desired voltage") is predetermined beforehand and the generated voltage is compared with the desired voltage to discriminate whether the former is higher or lower than the latter and thereby to effect selective control of either conduction or nonconduction of an exciting current through an exciting coil. However, with the apparatuses of the abovementioned principle of voltage control it sometimes occurs that, in a case where the rotational speed of the electric generator is low or under some condition of electric load, a generated voltage is apt to depart from the predetermined desired voltage due to a time delay in the response of the voltage control system, etc., and besides, once a generated voltage has departed away from the predetermined desired voltage, it is difficult for a generated voltage to settle down promptly to the predetermined desired voltage, causing it to fluctuate with a long period (generally called the phenomenon of "hunting"), thus making it impossible to effect the voltage control with favourable precision. This fact offers a serious problem when an operating system such as a microcomputer or the like, which requires a power supply regulated with high precision, is installed on a vehicle and connected as an electric load. Nevertheless, it is expected that voltage control with high precision will be required more and more in the future.

Further, it is a recent tendency to fabricate voltage control apparatuses for electric generators for vehicles using integrated semiconductor circuits (hereinafter abbreviated as "IC"). However, voltage control apparatuses used presently comprise an initial excitation resistor of a relatively high power rating connected in series with a current supply circuit for an exciting coil in order to prevent overdischarge of a battery by limiting an exciting current to a possible minimum value in the stage of initial excitation of an electric generator. Thus, this fact makes it impossible to fabricate that portion in an IC and forms a factor to incur high cost.

This invention has been made in view of the above-mentioned problem and aims at providing a voltage control apparatus for electric generators for vehicles which is designed to effect suitable initial excitation and to make an initial excitation resistor unnecessary and which enables to control, with higher precision, a generated voltage or a battery charging voltage from an electric generator driven by a vehicle-mounted engine throughout the entire range of its rotational speeds.

One of the features of this invention resides in that a detected voltage corresponding to a difference between a generated voltage or a battery charging voltage and a reference voltage is compared with a triangular waveform voltage generated at constant periods, and duty-factor-control of an exciting current is effected always at constant periods depending on the relative magnitude of the above-mentioned voltages.

Further, another feature of this invention resides in that an exciting coil is energized intermittently in response to an oscillating signal having a predetermined repetition period during a time interval from the switching-on of a key switch to a moment when the electric generator reaches a predetermined generating state thereby to limit an average value of the exciting current to a degree necessary to assure the build-up of the electromotive force (hereinafter simply termed "the build-up") of the electric generator.

This and other objects, features and advantages of the present invention will be made apparent from the following descriptions taken in conjunction with the accompanying drawings, in which.

Figure 1:
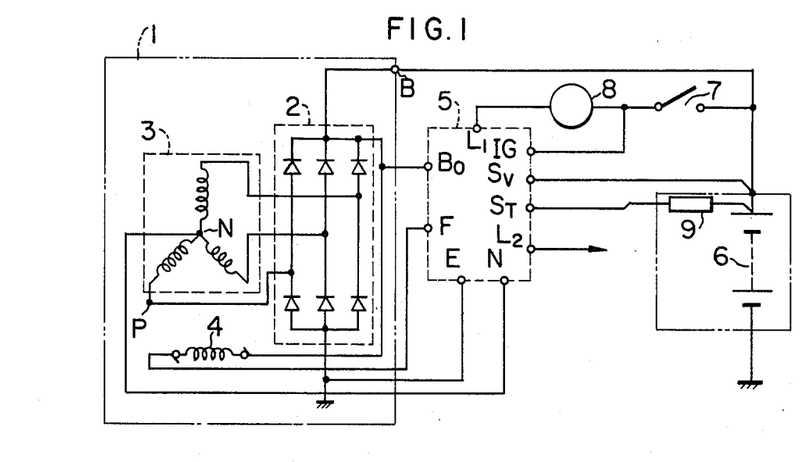
FIG. 1 is a general circuit diagram showing an embodiment of the apparatus of this invention.

An explanation will hereinafter be given of this invention with respect to the embodiments thereof shown in the drawings. FIG. 1 is a circuit diagram showing the general construction of the apparatus of this invention. Numeral 1 designates an electric generator driven by an engine mounted on a vehicle. It will be simply termed "generator" in the following descriptions. The generator 1 comprises an armature coil 3, an exciting coil 4 for exciting the generator 1 and a full-wave rectifier 2. The generator 1 shown here produces a d.c. output obtained through the rectification of a three-phase a.c. voltage generated in the Y-connection armature winding 3. Numeral 5 designates a voltage regulator provided with various input and output terminals. The voltage regulator 5 mainly effects the control of energization of the exciting coil 4 and an indicating means 8 for indicating a state of electric generation by the generator 1. Numeral 6 designates a battery mounted on the engine, 7 a key switch, 8 the electric generation indicating means comprising a lamp, a light-emitting diode, etc., and 9 a battery temperature detecting device which comprises a temperature detecting element, such as thermistor, a heat-sensitive diode, etc., disposed in the electrolyte of the battery or attached to a portion of the body of the battery and outputs an electric signal whose level varies in response to detected temperatures. The construction of the electric circuit block of the voltage regulator 5 in this embodiment of the invention is designed with a view to fabricating it in the form of IC.

Next, the detailed construction of the voltage regulator 5 will be described hereinafter in conjunction with the illustration of FIG. 2. Firstly, with respect to the various kinds of input and output terminals of the voltage regulator 5, symbol "$B_o$" designates an input terminal for inputting a voltage generated by the generator 1 as a detected voltage, "$L_1$" an output terminal which develops a low output impedance and drives the indicating means 8, "$L_2$" an output terminal for outputting an electric generation indicating signal which shows that the build-up of a voltage generated by the generator 1 has been completed, "IG" an input terminal which receives a power source voltage from an ignition terminal of the key switch 7 when it has been closed, "$S_V$" an input terminal for detecting an inputting a battery charging voltage, "$S_T$" an input terminal for inputting a signal responding to temperatures of the battery 6, "N" an input terminal for detecting the state of electric generation by the generator 1, namely, for inputting a voltage of the neutral point of the armature winding of the alternator 1 in this case, "E" an input terminal for inputting a ground potential, and "F" an output terminal for controlling an exciting current flowing through the exciting coil 4.

Figure 2:
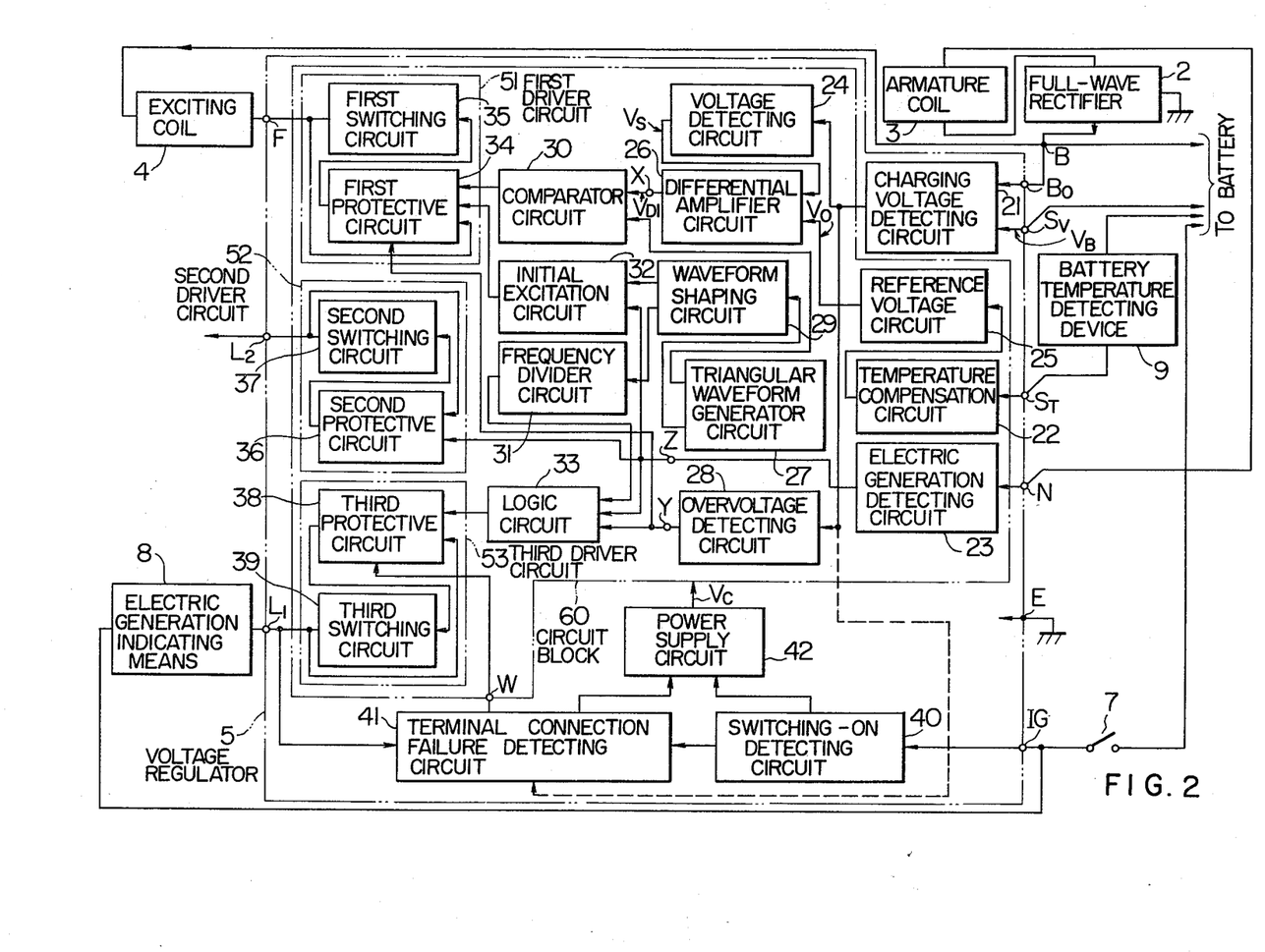
FIG. 2 is a block diagram showing a concrete embodiment of the apparatus of this invention.

Then, referring to the block diagram of FIG. 2 showing the construction of the voltage regulator 5, numeral 21 designates a charging voltage detecting circuit, which inputs a generated voltage and a battery charging voltage $V_B$ at its terminals $B_o$ and $S_V$, respectively, and outputs normally a voltage responding to a battery charging voltage $V_B$, but outputs a voltage responding to a generated voltage received at the terminal $B_o$ when it has become impossible to receive a battery charging voltage $V_B$ at the terminal $S_V$ due to a contact failure occurring at the terminal $S_V$ or the breakage of an input connection wire to the terminal $S_V$. Numeral 22 designates a temperature compensation circuit receiving a detection signal which the battery temperature detecting device 9 supplies to the terminal $S_T$ of the voltage regulator 5 and operating to modify a reference voltage generated in a reference voltage circuit 25 in response to the above-mentioned detection signal, thereby imparting a necessary temperature characteristic to a voltage to be regulated by the voltage regulator 5. This necessary temperature characteristic is to make the battery charging characteristic approach, as closely as possible, an ideal temperature versus charging voltage characteristic of the battery within a limited voltage range required by the vehicle. Numeral 23 designates an electric generation detecting circuit which inputs a neutral point voltage of the generator 1 received at the terminal N in this case and generates an electric generation signal when it detects that the neutral point voltage has reached a predetermined value which presumes the completion of the build-up of a voltage generated by the generator 1.

Numeral 24 designates a voltage detecting circuit which comprises a smoothing element such as a capacitor, etc. at its input stage. The voltage detecting circuit 24 receives an output voltage of the charging voltage detecting circuit 21 and smooths it to some degree and outputs a detected voltage $V_S$ obtained by dividing the input voltage at a predetermined ratio. Numeral 25 designates a reference voltage circuit which divides a constant voltage $V_c$ supplied from a power supply circuit 42 at a predetermined ratio and generates a reference voltage $V_o$ which has been temperature-compensated by an output signal of the temperature compensation circuit 22 as described before. Numeral 26 designates a differential amplifier circuit which receives a detected voltage $V_S$ from the voltage detecting circuit 24 and a reference voltage $V_o$ from the reference voltage circuit 25 as input signal voltages thereto and amplifies a difference between both input signal voltages at a predetermined amplification degree to output a resultant detected voltage $V_D$. Numeral 27 designates a triangular waveform generator circuit which receives a power supply from the power supply circuit 42 and generates a triangular waveform voltage of a predetermined frequency (about 50–100 Hz). Numeral 28 designates an overvoltage detecting circuit which monitors an output voltage from the charging voltage detecting circuit 21 and outputs an overvoltage detection signal when it has detected that the output voltage of the charging voltage detecting circuit 21 has taken an excessively high value which is considered to be abnormal. Numeral 29 designates a waveform shaping circuit which detects an instant when a triangular waveform voltage, which is supplied from the triangular waveform generator circuit 27, reaches a preset level and forms a pulse signal having a predetermined duty ratio. Numeral 30 designates a comparator circuit which inputs a detected voltage $V_D$ from the differential amplifier circuit 26 and a triangular waveform voltage from the triangular waveform generator circuit 27 and generates a comparison signal depending on the relative magnitude of both voltages. Numeral 31 designates a frequency divider circuit which divides the frequency of a pulse signal supplied from the waveform shaping circuit 29 to form a pulse signal having a frequency (about 1–10 Hz) which permits assured perception of a flashing operation of an indicating means. Numeral 32 designates an initial excitation circuit which receives a pulse signal from the waveform shaping circuit 29 and an electric generation signal from the electric generation detecting circuit 23 and generates an initial excitation intermitting command signal which commands to energize intermittently the exciting coil 4 in response to the state of "H" or "L" level of a pulse signal from the waveform shaping circuit 29 during a time interval from the switching-on of the key switch 7 to the reception of an electric generation signal.

Numeral 33 designates a logic circuit which inputs a pulse signal from the frequency divider circuit 31, an electric generation signal from the electric generation detecting circuit 23 and an overvoltage detection signal from the overvoltage detecting circuit 28 and generates a lighting command signal during a time interval from the switching-on of the key switch 7 to the reception of an electric generation signal. On the other hand, the logic circuit 33 outputs a pulse signal supplied from the frequency divider circuit 31 as a flashing command signal while the logic circuit 33 is receiving an overvoltage detection signal.

Numeral 51 designates a first driver circuit which comprises a first protective circuit 34 and a first switching circuit 35 and inputs a comparison signal from the comparator circuit 30 and an initial excitation intermitting command signal from the initial excitation circuit 32. Especially, when an initial excitation intermitting command signal has been received, the first driver circuit 51 responses to the initial excitation intermitting command signal in preference to a comparison signal and drives the first switching circuit 35 to control intermittent energization of the exciting coil 4. But, after the initial excitation intermitting command signal has ceased, the first driver circuit 51 drives the first switching circuit 35 depending on the state of "H" or "L" level of a comparison signal received. The first protective circuit 34 monitors an electric potential of each of a comparison signal, an initial excitation intermitting command signal, and the output terminal F of the first driver circuit 51. If a power source voltage is impressed by accident on the output terminal F due to short-circuit of the exciting coil 4, etc. while the first switching circuit 35 is in operation (that is, when the first switching circuit 35 is in a state of drawing an electric current), the first protective circuit 34 immediately causes the first switching circuit 35 to stop its operation and prevents a transistor in the output stage of the first switching circuit 35 from being destroyed by a possible excessive current. Now, it should be noted that the term "an electric current drawing state" used here represents that a portion of an electric circuit is at a potential of zero or negative level and in a state ready to draw an electric current from the outside, on the other hand, the term "an electric current supplying stage" used here represents that a portion of an electric circuit is at a potential of positive level and in a state ready to supply an electric current to the outside. Further, the first protective circuit 34 is constructed to input an overvoltage detection signal from the overvoltage detecting circuit 28 and to cause the first switching circuit 35 to stop its operation upon appearance of an overvoltage.

Numeral 52 designates a second driver circuit which comprises a second protective circuit 36 and a second switching circuit 37 and inputs an electric generation signal from the electric generation detecting circuit 23. The second driver circuit 52 puts its output terminal $L_2$ in an electric current supplying state during a time interval from the switching-on of the key switch 7 to the reception of an electric generation signal, on the other hand, puts its output terminal $L_2$ in an electric current drawing state while the second driver circuit 52 is receiving an electric generation signal. Namely, it is possible to supply a signal from the output terminal $L_2$ in response to the states of electric generation of the generator 1. Therefore, if an external load is connected to the output terminal $L_2$, it is possible to supply a check signal or a drive command signal to the external load in response to the states of electric generation of the generator 1. Further, the second protective circuit 36 has the same function as that of the above-described first protective circuit 34. If a power source voltage or a ground potential is impressed by accident on the output terminal $L_2$ when the second switching circuit 37 is in operation, namely, when the second switching circuit 37 is in an electric current drawing or supplying state, the second protective circuit 36 immediately causes the second switching circuit 37 to stop its operation and prevents a heavy current from flowing through a transistor in the output stage of the second switching circuit 37.

Numeral 53 designates a third driver circuit which comprises a third protective circuit 38 and a third switching circuit 39. When the third driver circuit 53 receives a lighting command signal or a flashing command signal from the logic circuit 33, the third switching circuit 39 operates to cause the indicating means 8 to be lighted or flashed. Further, the third protective circuit 38 operates in the same way as the first and second protective circuits 34 and 36, respectively, and if a power source voltage is impressed by accident on the output terminal $L_1$ of the third driver circuit 53 when it is in an electric current drawing state, the third protective circuit 38 operates to stop the operation of the third switching circuit 39.

Numeral 40 designates a switching-on detecting circuit which responds to the operation of the key switch 7. When the key switch 7 is switched on and a battery voltage (or a power source voltage) is applied normally to the terminal IG, the switching-on detecting circuit 40 supplies a battery voltage to a power supply circuit 42 and simultaneously stops the operation of a terminal connection failure detecting circuit 41. If a battery voltage is not supplied to the switching-on detecting circuit 40 due to a connection failure occurring at the terminal IG, etc. despite that the key switch 7 has been switched on, no operation stopping signal is sent from the switching-on detecting circuit 40 to the terminal connection failure detecting circuit 41. In such a case, the terminal connection failure detecting circuit 41 operates to supply a battery voltage to the power supply circuit 42 via the indicating means 8 and the circuit 41 itself. At this time, the terminal connection failure detecting circuit 41 sends an inhibit signal to the third driver circuit 53 to prevent it from being put into an electric current drawing state. Thus, the power supply circuit 42 produces a constant voltage stabilized by a constant voltage element and supplies the constant voltage (5 to 8 volts, for example) to each circuit in the circuit block 60 shown in FIG. 2. Here, it may be possible to make the terminal connection failure detecting circuit 41 receive an electric generation voltage through the charging voltage detecting circuit 21, as shown by a broken line in FIG. 2, instead of receiving a battery voltage via the indicating means 8.

The operation of the apparatus of this invention having the above-described construction will be explained hereinafter.

Firstly, before the key switch 7 is closed, no power source voltage is supplied to the voltage regulator 5, and the terminals F, $L_1$ and $L_2$ remain in an open or de-energized state.

Then, when the key switch 7 has been closed, a power source voltage is supplied to the voltage regulator 5 through the terminal IG to cause the switching-on detecting circuit 40 and the power supply circuit 42 to be operative, and the latter circuit 42 supplies a constant voltage to each circuit in the circuit block 60 in FIG. 2. If no power source voltage is supplied to the switching-on detecting circuit 40 due to a connection failure, coming-off of a connecting wire, etc. occurring at the terminal IG, then the terminal connection failure detecting circuit 41 operates and a power source voltage is supplied to the power supply circuit 42 via the terminal connection failure detecting circuit 41 and the indicating means 8 or the charging voltage detecting circuit 21.

Since the generator 1 is not yet in a state of electric generation before the engine starts its operation, the electric generation detecting circuit 23 detects that the generator 1 is still in an inactive state and continues to output a non-electric-generation signal, thereby causing the initial excitation circuit 32 to be operative. Therefore, the initial excitation circuit 32 applies to the first driver circuit 51 an initial excitation intermitting command signal in response to a pulse signal from the waveform shaping circuit 29 to control intermittent energization of the exciting coil 4. Further, in the intermittent energization control, the duty factor or the conduction rate of the initial excitation intermitting command signal is preset to limit an average value of an initial exciting current flowing through the exciting coil 4 to a low degree (about 300 mA) still permitting the build-up of the generator 1. Further, the signal representing a state of non-electric-generation from the electric generation detecting circuit 23 is supplied also to the second driver circuit 52 and the logic circuit 33, whereby the second driver circuit 52 puts its output terminal $L_2$ in an electric current supplying state representing a state of non-electric-generation, and, on the other hand, the logic circuit 33 outputs a pulse signal, which it has received from the frequency divider circuit 31, to cause the third driver circuit 53 to operate and thereby to drive the indicating means 8 to be lighted.

Now, when the engine has started its operation, the rotor of the generator 1 is driven to rotate, and the electromotive force of the generator 1 starts to build up due to an initial exciting current as described before, and the neutral point voltage of the generator 1 also starts to build up. The electric generation detecting circuit 23 detects the build-up of the neutral point voltage, and it outputs an electric generation signal when the neutral point voltage has reached a predetermined value. Then, the initial excitation circuit 32 stops to generate an initial excitation intermitting command signal, the second driver circuit 52 puts its output terminal $L_2$ in an electric current drawing state representing a state of electric generation, and the third driver circuit 53 puts its output terminal $L_1$ in a high impedance state representing a state of electric generation and causes the indicating means 8 to stop its operation.

Next, since the initial excitation circuit 32 stops its operation, the first driver circuit 51 controls energization of the exciting coil 4 in response to a comparison signal from the comparator circuit 30. Next, an explanation will hereinafter be made of the excitation control system by the use of a triangular waveform voltage in conjunction with the signal waveform diagram of FIG. 3.

Upon switching-on of the key switch 7, the triangular waveform generator circuit 27 is supplied with a power supply voltage and starts its oscillating operation. But, this is still before the start of the engine and the generator 1 has not yet started electric generation. In this state, a battery voltage $V_B$ (substantially 12 volts, for example) is supplied to the terminal $S_V$, and the divided output voltage $V_s$ of the voltage detecting circuit 24 is smaller than the reference voltage $V_o$ supplied from the reference voltage circuit 25 ($V_s < V_o$). The differential amplifier circuit 26 generates a detected voltage $V_D$ having a value which depends on a difference between both input voltages. [$V_D = K(V_o - V_s)$, where K is an amplification degree of the differential amplifier circuit 26.] In this case, the detected voltages $V_D$ takes a value $V_{D1}$, as shown at (d) in the waveforms (A) of FIG. 3, which is greater than a maximum voltage $V_2$ of the triangular waveform voltage from the triangular waveform generator circuit 27, and the comparator circuit 30 outputs a comparison signal voltage which is always at "H" level as shown by the waveform (D) of FIG. 3. However, at this stage the initial excitation circuit 32 is in operation causing an initial exciting current to be supplied to the exciting coil 4, and the comparison signal voltage from the comparator circuit 30 is disabled in the first driver circuit 51.

Now, when the engine has started its operation, as a generated voltage of the alternator 1 builds up gradually, a battery charging voltage $V_B$ also rises and a divided output voltage $V_s$ of the voltage detecting circuit 24 increases, so that the difference between the divided voltage $V_s$ and the reference voltage $V_o$ becomes smaller. If the comparator circuit 30 receives at one of its input terminals a triangular waveform voltage shown at (c) in the waveforms (A) of FIG. 3 and at the other one of its input terminals a detected voltage $V_{D2}$ shown at (a) in the waveforms (A) of FIG. 3, for example, which is smaller than the aforesaid detected voltage $V_{D1}$ ($V_s < V_o$ holds also in this case,) the comparator circuit 30 outputs a pulsed voltage shown at the waveform (B) of FIG. 3. The output stage transistor of the first driver circuit 51 becomes conductive to energize the exciting coil 4 when an output voltage of the comparator circuit 30 is at "H" level, for example, and, on the other hand, it becomes nonconductive to de-energize the exciting coil 4 when an output voltage of the comparator circuit 30 is at "L" level. Here, if a battery charging voltage $V_B$ received at the terminal $S_V$ is lower than a predetermined desired voltage, it is designed to increase a conduction ratio in one period $t_2/T$ (generally termed "duty factor"), as shown by the waveform (B) of FIG. 3, and to increase an average current flowing through the exciting coil 4, thereby raising the excitation by the exciting coil 4.

If a generated voltage from the generator 1 further rises, a battery charging voltage $V_B$ also rises and a divided voltage $V_s$ in the voltage detecting circuit 24 increases. It is so designed that, when a battery charging voltage $V_B$ exceeds the predetermined desired voltage, a divided voltage $V_s$ becomes greater than the reference voltage $V_o$ ($V_s < V_o$), and hence a detected voltage $V_{D3}$ from the differential amplifier circuit 26 in this case becomes smaller than the reference voltage $V_o$. If the comparator circuit 30 receives the detected voltage $V_{D3}$ shown at (b) in the waveforms (A) of FIG. 3, for example, which is lower than the reference voltage $V_o$ shown at (f) in the waveforms (A) of FIG. 3 ($V_s < V_o$ holds in this case), the comparator circuit 30 generates an output voltage shown by the waveform (C) of FIG. 3. It is seen that a conduction ratio $t_2/T$ is made smaller depending on the magnitude of a detected voltage $V_D$ to reduce the magnitude of an average current flowing from an output stage transistor in the first driver circuit 51 through the exciting coil 4, thus controlling a rise in the generated voltage of the generator 1 by gradually reducing its excitation.

In the above case, it is designed that a detected voltage $V_D$ becomes smaller than the reference voltage $V_o$ when a battery charging voltage exceeds the predetermined desired voltage. In this design, an operational amplifier in the differential amplifier circuit 26 is supplied with a positive power supply. On the other hand, if it is designed that the differential amplifier circuit 26 is supplied with a positive power supply and a negative power supply, the differential amplifier circuit 26 may output a negative voltage depending on a difference between two input voltages.

Figure 3:
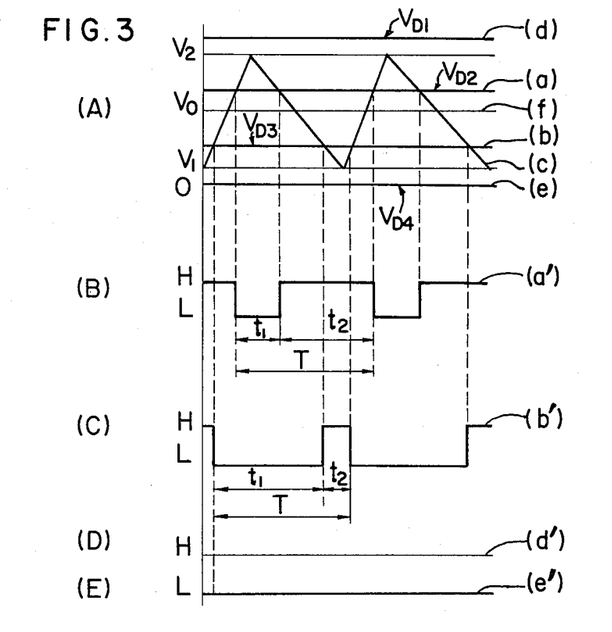
FIGS. 3 and 4 are, respectively, a signal waveform diagram and a control characteristic diagram for illustrating the operation of the apparatus of this invention.

Next, if it is preset that a detected voltage $V_D$ takes a ground potential, when a battery charging voltage $V_B$ exceeds the predetermined desired voltage to a high degree by some cause, and the triangular waveform generator circuit 27 generates a triangular waveform voltage whose minimum voltage is a voltage $V_1$ shown in the waveforms (A) of FIG. 3 which is somewhat above a ground potential, then the comparator circuit 30 receives at one of its input terminals a detected voltage $V_{D4}$ shown at (e) in the waveforms (A) of FIG. 3 ($V_s < V_o$ also holds here) and generates an output voltage which is always at "L" level as shown by the waveform (E) of FIG. 3. Accordingly, the output stage transistor in the first driver circuit 51 becomes nonconductive to render the exciting coil 4 de-energized. Further, if a battery charging voltage rises to an extent which is considered to be abnormal, the overvoltage detecting circuit 28 generates an overvoltage detection signal and causes the indicating means 8 to be flashed through the logic circuit 33 and the third driver circuit 53. On the other hand, if a battery charging voltage becomes smaller than the predetermined desired voltage, a detected voltage $V_D$ exceeds the voltage $V_1$, which effects some degree of excitation again and raises the battery charging voltage. Thus, it is possible to regulate a battery charging voltage at the predetermined desired value.

Further, if a connection wire is disconnected by accident from the battery charging terminal while the excitation of the generator 1 is under way, a generation voltage of the generator 1 rises heavily and instantly. In such a case, the overvoltage detecting circuit 28 detects the accident before the detection thereof by the voltage detecting circuit 24, which has a comparatively big time delay, so that it is possible to stop immediately the operation of the first driver circuit 51 by an overvoltage detection signal produced by the overvoltage detecting circuit 28.

As is understood from the foregoing explanation, it is arranged in the above-described embodiment that the detected voltage $V_D$, which is an output voltage of the differential amplifier circuit 26, varies upward or downward with respect to the reference voltage $V_o$ representing the predetermined desired voltage, so that the detected voltage $V_D$ varies downward with respect to the reference voltage $V_o$ when a battery charging voltage is higher than the predetermined desired voltage. The width of variations of the detected voltage $V_D$ is determined by an amplification degree of the differential amplifier circuit 26, etc., especially in consideration of the relation with the voltage swing $(V_2-V_1)$ of the triangular waveform voltage. Now, an explanation will be given of a ratio $(\Delta D/\Delta V_{reg})$ of an increment $(\Delta D)$ of the duty factor $(D=t_2/T)$ of the energization of the exciting coil 4 to an increment $(\Delta V_{reg})$ of a battery charging voltage in conjunction with the illustration of FIG. 4. Firstly, the control characteristic designated by (g) shows a voltage control method according to a conventional one point detection system in which 100% excitation is effected when a battery charging voltage is lower than the predetermined desired value (14.5 volts in this case), while excitation is completely stopped when a battery charging voltage is higher than the predetermined desired value.

Figure 4:
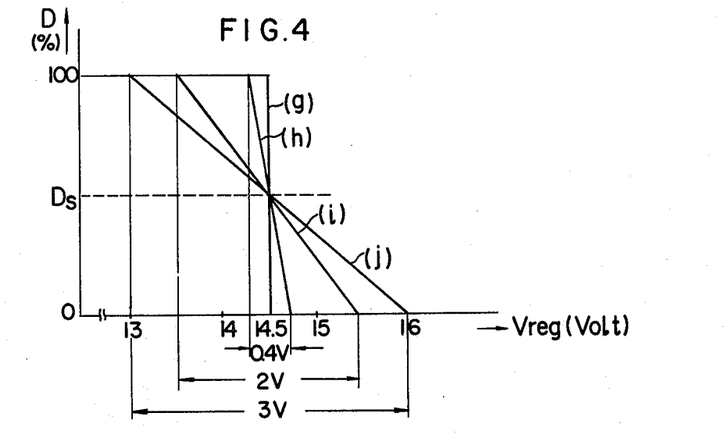

In contrast thereto, in the embodiment of this invention, a suitable control characteristic may be chosen from the performance characteristics indicated by (h), (i), (j), etc. in FIG. 4, for example, in accordance with the setting of the reference voltage $V_o$, the triangular waveform voltage, and further a load characteristic and an excitation characteristic of the generator 1, and the duty factor D (a ratio of an excitation time to one complete period) is adjusted continuously at every period depending on the value of a battery charging voltage. Only, when a control characteristic indicated by (i) or (j) is chosen and set, the ratio $\Delta D/\Delta V_{reg}$ becomes small. Consequently, if a relatively heavy electric load is connected to the generator 1 which is controlled under the above-mentioned condition, for example, a generated voltage of the generator 1 is greatly reduced depending on the load characteristic of the generator 1. In this case, since the duty factor D is not increased so much as compared with the great reduction in the generated voltage of the generator 1, much time is required before the generated voltage of the generator 1 is restored to the predetermined desired voltage, and hence it sometimes occurs that the generated voltage of the generator 1 to be controlled fluctuates with a big swing.

Therefore, it is desirable that the ratio $\Delta D/\Delta V_{reg}$ may have a characteristic represented by a comparatively steep straight line or curve so long as it does not give rise to a phenomenon of hunting as described before.

In the embodiment of the present invention there has been chosen a characteristic line as indicated by (h) in FIG. 4 whose slope is set so as to effect the duty factor control of 0-100% within a voltage variation of about $\pm 0.2-0.3$ volt with respect to a predetermined desired voltage of about 14.5 volts. Further, the crossing point of the characteristic lines (h), (i) and (j) indicates a duty factor $D_s$ which gives an exciting current necessary for obtaining a generated voltage of 14.5 V under the conditions of a rated rotational speed and a rated load for a given electric generator.

Figure 5:
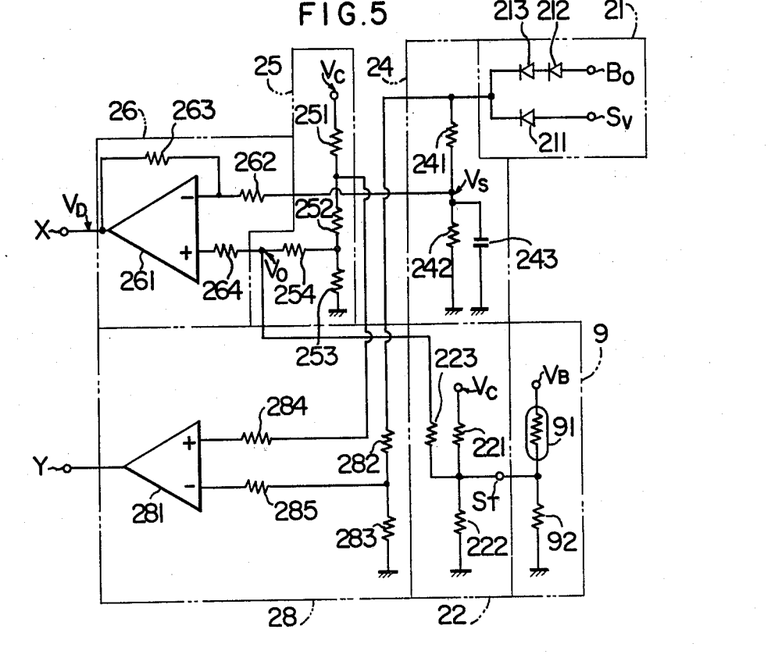
FIGS. 5 to 9 are electric circuit diagrams showing concrete examples of the electric circuits of the apparatus of this invention.

Next, an explanation will be given of embodiments of this invention embodying the block construction shown in FIG. 2 by making reference to FIGS. 5 to 9. Firstly, FIG. 5 shows concrete exemplifying circuits for the blocks 21, 22, 24, 25, 26 and 28 and the battery temperature detecting device 9. The charging voltage detecting circuit 21 comprises a diode 211 connected to the terminal $S_V$ and two diodes 212 and 213 connected to the terminal $B_o$, and it normally outputs a battery charging voltage $V_B$ received at the terminal $S_V$. The voltage detecting circuit 24 comprises voltage dividing resistors 241 and 242 and a smoothing capacitor 243 and generates a divided voltage $V_s$. The battery temperature detecting device 9 disposed outside the voltage regulator 5 comprises a thermistor 91 having one of its terminals connected to a terminal of the battery 6 and detecting temperatures of an electrolyte in the battery 6 and an a adjusting resistor 92, and it supplies a detection voltage signal, which has been obtained by detecting an electrolyte temperature and a battery terminal voltage, to the terminal $S_T$ of the voltage regulator 5. The temperature compensation circuit 22 comprises resistors 221 to 223 and produces an additional correction voltage signal for correcting a reference signal by adjusting a stabilized voltage with a detection voltage signal supplied by the battery temperature detecting device 9. The reference voltage circuit 25 comprises voltage dividing resistors 251 to 254 and produces a desired reference voltage $V_o$ by the summation of a main divided voltage given by voltage dividing resistors 251 to 253 and a correction voltage supplied by the temperature compensation circuit 22. The differential amplifier circuit 26 comprises an operational amplifier 261 and resistors 262 to 264 and generates at its output terminal X an output voltage $V_D$ which is obtained by differentially amplifying both input voltages $V_s$ and $V_o$. The overvoltage detecting circuit 28 comprises an operational amplifier 281, voltage dividing resistors 282 and 283 and input resistors 284 and 285, and it generates at its output terminal Y a detection signal of zero level when the output voltage of the charging voltage detecting circuit 21 reaches a predetermined value which is considered to be an excessive voltage.

Figure 6:
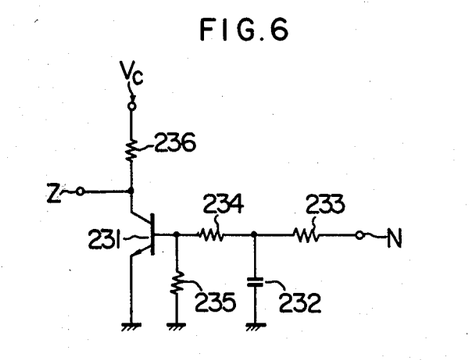

Next, FIG. 6 shows a concrete example of the electric generation detecting circuit 23. The electric generation detecting circuit 23 shown in FIG. 6 comprises a transistor 231, a capacitor 232 and a resistor 233, which form a smoothing circuit, dividing resistors 234 and 235 and a collector resistor 236. The circuit 23 receives a neutral point voltage, as an input signal thereto, from the terminal N. When the neutral point voltage reaches a predetermined value, the transistor 231 becomes conductive and produces an electric generation signal of zero level at its output terminal Z.

Figure 7:
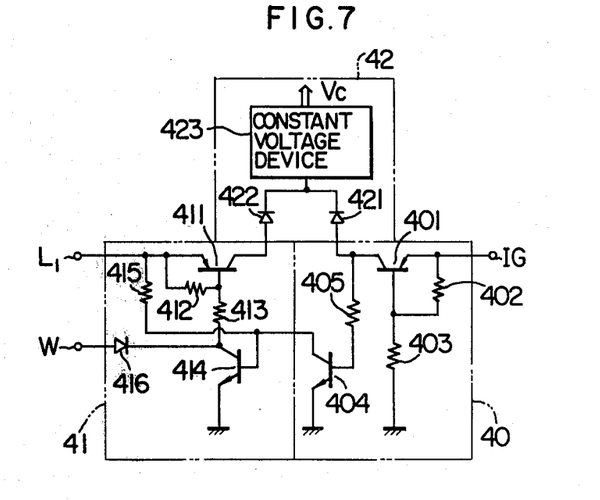

Next, FIG. 7 shows concrete exemplifying circuits for the blocks 40, 41 and 42 in FIG. 2. The key switch switching-on detecting circuit 40 comprises a power transistor 401, resistors 402, 403 and 405, and another transistor 404. When the circuit 40 receives a battery voltage from the terminal IG, the power transistor 401 becomes conductive to supply electric power to a succeeding stage and at the same time to render the transistor 404 conductive. The terminal connection failure detecting circuit 41 comprises a power transistor 411, resistors 412, 413 and 415, another transistor 414 and a diode 416. The circuit 41 operates in a way such that, only when no battery voltage appears at the terminal IG and hence the transistor 404 remains nonconductive, the transistor 414 becomes conductive thereby to render the power transistor 411 conductive, thus making it possible to supply a battery voltage from the terminal $L_1$ to the succeeding stage, to put its output terminal W in the electric current drawing state of zero level, and to force the transistor 536 in the third driver circuit 53 shown in FIG. 8 to be nonconductive, thereby bringing the output terminal $L_1$ into an open state. The power supply circuit 42 comprises diodes 421 and 422 and a constant voltage device 423. The circuit 42 operates to regulate an input voltage thereto at a predetermined constant voltage $V_c$ (for example, 7 volts) and to supply it to each of the circuits. The constant voltage device 423 comprises a publicly known circuit containing a Zener diode, etc.

Figure 8:
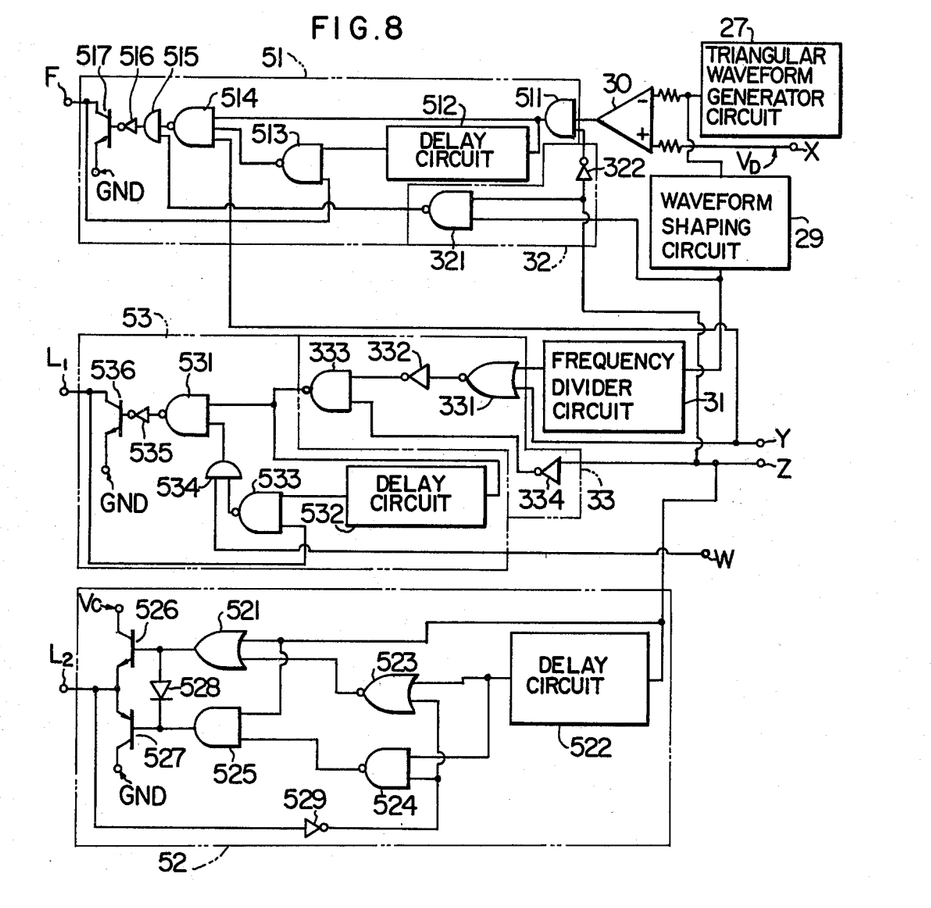

Next, FIG. 8 shows mainly concrete exemplifying circuits for the blocks 32, 33, 51, 52 and 53 shown in FIG. 2. Firstly, the initial excitation circuit 32 comprises a NAND gate 321 and an inverter gate 322, and the circuit 32 is controlled by an electric generation signal coming from the terminal Z. The first driver circuit 51 comprises AND gates 511 and 515, a delay circuit 512, NAND gates 513 and 514, an inverter gate 516 and a power transistor 517. The logic circuit 33 comprises a NOR gate 331, inverter gates 332 and 334 and a NAND gate 333 and is controlled by an overvoltage detection signal from the terminal Y as well as an electric generation signal from the terminal Z. The third driver circuit 53 comprises NAND gates 531 and 533, a delay circuit 532, an AND gate 534, an inverter gate 535 and a power transistor 536. The second driver circuit 52 comprises an OR gate 521, a NOR gate 523, a delay circuit 522, a NAND gate 524, an AND gate 525, transistors 526 and 527, a diode 528 and an inverter gate 529. The second driver circuit 52 is controlled by an electric generation signal supplied from the terminal Z.

Figure 9:
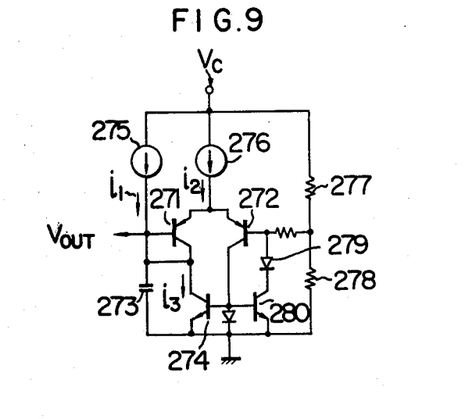

Next, FIG. 9 shows a concrete example of the triangular waveform generator circuit 27. The triangular waveform generator circuit 27 comprises transistors 271, 272, 274 and 280, a charge-and-discharge capacitor 273, constant current sources 275 and 276, reference voltage forming resistors 277 and 278, a diode 279, etc. The triangular waveform generator circuit 27 outputs a triangular waveform voltage $V_{OUT}$ by repeating a charging operation with a constant charging current $i_1 + i_2$ during each time period until a voltage across the capacitor 273 reaches a divided voltage established by the resistors 277 and 278 as well as a discharge operation with a constant discharge current $i_3 - i_1$ during each time period until the voltage across the capacitor 273 reaches a forward voltage of the diode 279 (here, it is preset beforehand that the relation $i_3 = i_2$ holds).

Now, a summarized explanation will be given of the operations of the above-described concrete circuits, especially, those of the circuits of the main parts of the apparatus of this invention shown in FIG. 8. In a first stage where the key switch 7 has been switched on but the generator 1 is generating no electromotive force, the transistor 231 in the electric generation detecting circuit 23 shown in FIG. 6 is in a nonconductive state and its output terminal Z stays at "1" level. Normally, at this time there is produced no overvoltage signal, so that the output terminal Y of the overvoltage detecting circuit 28 in FIG. 5 is at "1" level, and hence the AND gate 511 is put in a closed state, which causes the output of the NAND gate 514 to stay at "1" level. Then, the on-off control of the transistor 517 is effected by a pulse signal (an oscillation signal) which is generated by the triangular waveform generator circuit 27 and the waveform shaping circuit 29 and supplied through the NAND gate 321, the AND gate 515 and the inverter gate 516, thereby causing an intermittent initial exciting current to flow through the exciting coil 4 connected to the output terminal F. Since the terminal Z is at "1" level, the output of the NAND gate 333 in the logic circuit 33 takes "1" level. Further, since the delay circuit 532 outputs a zero level signal during an initial predetermined time period and normally a "1" level signal is supplied to the terminal W, the output of the AND gate 534 is at "1" level. Consequently, the output of the NAND gate 531 takes zero level to give a "1" level signal to the base of the transistor 536, thereby causing the transistor 536 to conduct. Further, once the transistor 536 has become conductive, the output signal at the collector of the transistor 536 is fed back to an input to the NAND gate 533 thereby to cause the NAND gate 531 to maintain its output at zero level and hence the transistor 536 to continue conducting. Thus, the indicating means 8 connected to the output terminal $L_1$ is lit to indicate that the generator 1 has not yet started electric generation. Further, at the same time, the OR gate 521 in the second driver circuit 52 outputs a "1" level signal to render the transistor 526 conductive, while, the AND gate 525 outputs a "1" level signal to render the transistor 527 nonconductive, thereby putting the output terminal $L_2$ into an electric current supplying state.

Next, when the engine has started its operation and the magnitude of the voltage of the neutral point of the generator 1 has reached a predetermined value, the transistor 231 in FIG. 6 becomes conductive and its output terminal Z takes zero level. As a result, the AND gate 511 in the first driver circuit 51 in FIG. 8 is opened, while the NAND gate 321 in the initial excitation circuit 32 is closed and continues to generate a "1" level signal at its output. Thereafter, the operation of the first driver circuit 51 is controlled by an output signal from the comparator circuit 30. Assume that the output of the comparator circuit 30 takes "1" level, for example. Since the delay circuit 512 continues to output a zero level signal thereby to maintain the output of the NAND gate 513 at "1" level, immediately after the output of the comparator circuit 30 has changed to "1" level, and further no overvoltage is detected at this time, so that the output terminal Y of the overvoltage detecting circuit 28 in FIG. 5 stays at "1" level, the output of the NAND gate 514 takes zero level thereby to render the transistor 517 conductive, which, in turn, renders the exciting coil 4 connected to the terminal F energized. Thus, when the terminal F has been changed to zero level, a feedback path from the collector of the transistor 517 to an input to the NAND gate 513 operates to maintain the output of the NAND gate 513 at "1" level even after the output of the delay circuit 512 has changed to "1" level. On the other hand, if the output of the comparator circuit 30 takes zero level, the output of the NAND gate 514 and hence that of the AND gate 515 take "1" level thereby to render the transistor 517 nonconductive and hence the exciting coil 4 de-energized.

Further, if an excessively high voltage occurs on the battery charging line, the overvoltage detecting circuit 28 in FIG. 5 detects it and operates to change its output terminal Y to zero level, which forces the output of the NAND gate 514 to become "1" level and hence causes the transistor 517 to become nonconductive. At the same time, a frequency-divided pulse signal generated by the frequency divider circuit 31 is sent through the NOR gate 331 and passes through the NAND gates 333 and 531, which then causes the ON-OFF operation of the transistor 536 and hence the flashing operation of the indicating means 8 connected to the terminal $L_1$.

Further, since the terminal Y remains at "1" level so long as no overvoltage appears, when the terminal Z takes zero level, the output of the NOR gate 331 is forced to take zero level, and hence the output of the NAND gate 333 is also forced to take zero level. As a result, the output of the NAND gate 531 in the third driver circuit 53 is forced to take "1" level, thereby rendering the transistor 536 nonconductive, the terminal $L_1$ de-energized and hence the indicating means 8 put out. Further, when the terminal Z is at zero level, the output of the AND gate 525 in the second driver circuit 52 always takes zero level, which renders the transistor 527 conductive and thereby puts the terminal $L_2$ into an electric current drawing state. Since the potential of the terminal $L_2$ in the electric current drawing state is fed back through the inverter gate 529 to an input to the NOR gate 523 to give "1" level thereto, two inputs to the NOR gate 523 take zero level and "1" level, respectively, which causes the output of the NOR gate 523 to take zero level. Thus, since both inputs to the OR gate 521 become zero level, the output of the OR gate 521 also takes zero level, which assures maintainance of the transistor 526 in a nonconductive state.

Figure 10:
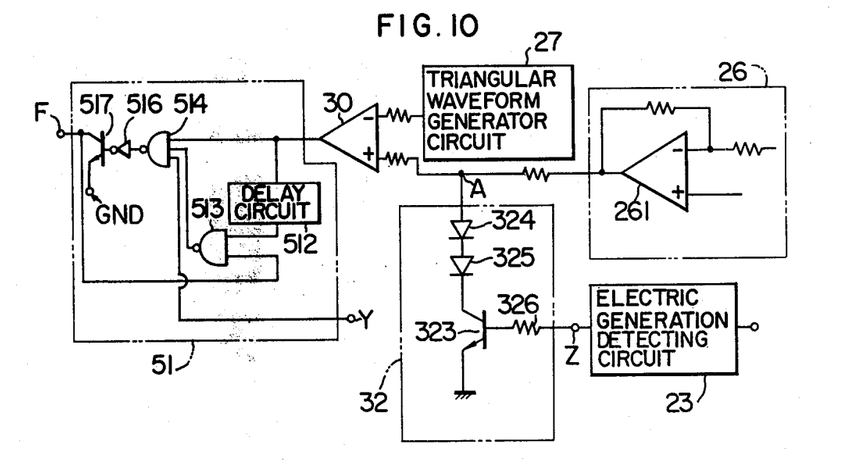
FIG. 10 is an electric circuit diagram showing another embodiment of the apparatus of this invention.

In the construction of the above-described embodiment, the initial excitation circuit 32 is connected to the first driver circuit 51 to give the latter an oscillation pulse signal, which was obtained by waveform-shaping a triangular waveform voltage generated by the triangular waveform generator circuit 27, directly without passing the comparator circuit 30, thereby to cause initial excitation. However, a construction for controlling an intermittent operation of the first driver circuit 51 is not limited to the above-described one. In another construction shown in FIG. 10, for example, the initial excitation circuit 32 is connected to an input to the comparator circuit 30, whereby in the state of no electric generation, that is, when the terminal Z is at "1" level, the transistor 323 is rendered conductive to cause the voltage at the point A forcibly to be set to a constant voltage to be determined by the diodes 324 and 325, irrespective of the state of the output of the differential amplifier circuit 26. With the above-described construction, the comparator circuit 30 makes a comparison between a triangular waveform voltage from the triangular waveform generator circuit 27 and the voltage at the point A to produce an oscillation pulse signal having the same period as that of the triangular waveform voltage and a constant duty factor determined by the relative magnitude of both voltages to be compared. Thus, it is possible to obtain the same functional effect as that brought by the above-described embodiment. Besides the foregoing, with a further construction in which the voltage of one of the inputs [either the reference voltage ($V_o$) side or the detected voltage ($V_s$) side] to the differential amplifier circuit 26 is made to take a fixed value in response to a signal from the electric generation detecting circuit 23 so that the output voltage of the differential amplifier circuit 26 may take a constant value only when electric generation has not yet taken place, it is also possible to obtain the same functional effect.

The above-explained voltage control apparatus embodying this invention has various features as shown below:

(1) By applying an oscillation signal, which changes on-and-off at a constant rate, to the first driver circuit 51 thereby to limit an exciting current from the moment of switching-on of the key switch 7 to the build-up of the generator 1, it is possible to limit an initial exciting current to a value necessary for assuring the build-up of the generator 1 without using initial exciting current limiting resistors, etc. and at the same time to prevent the battery from fully discharging in a short time when a driver has failed to switch off the key switch 7.

(2) In this invention, the exciting coil 4 is rendered energized and de-energized always at a constant rate by comparing a voltage corresponding to a difference between a battery charging voltage and a reference voltage with an output voltage of the triangular waveform generator circuit 27 and thereby causing the output stage transistor in the first driver circuit 51 to turn conductive and nonconductive depending on the relative magnitude of both comparison voltages. Therefore, the voltage control apparatus of this invention differs from an apparatus of the conventional type which makes a direct comparison between a charging voltage and a reference voltage to effect an on-off operation at an unstable rate. Consequently, it is possible to prevent hunting of a charging voltage or a charging current and hence undesirable oscillation of an indicating needle of a voltmeter or ammeter.

(3) Since this invention provides redundancy to permit power supply to the control part also from the terminal $L_1$ connected to the key switch 7 via the load 8, other than from the terminal IG, by detecting whether the key switch 7 is in a closed state or not and power supply is effected normally through the terminal IG or not, it is possible to maintain the function of electric generation of the generator 1 even if contact failure due to a defective connector, etc. or coming-off of a lead wire terminating lug occurs at the terminal IG, or a lead wire end falls off from the terminal IG to ground.

(4) The terminal $L_2$, which is used to inform other apparatuses as to whether the generator 1 is in the state of electric generation, may be made to operate as an electric current supplying or drawing terminal depending on the state of electric generation, and it is possible to select freely the other apparatuses without causing any interference with the input impedance of each of such apparatuses.

(5) The construction that the circuit 28 for detecting a charging voltage is provided other than the voltage detecting circuit 24 comprising a voltage smoothing capacitor thereby to render the first driver circuit 51 inoperative and to cause the electric generation indicating means 8 to flash, as soon as a charging voltage has risen abnormally, brings the following effects:

(a) Since it is possible to render the first driver circuit 51 inoperative without any time delay, which might be caused by the existence of a capacitor, when the end of a lead wire has come off from a battery charging terminal and a generated voltage has risen abruptly, the output transistor of the first driver circuit 51 can be prevented from being damaged by a possible heavy current flowing therethrough; and (b) Since it is possible to warn a driver of the occurrence of an abnormal state distinctly by the flashing operation of the electric generation indicating means 8 when a generated voltage has risen abruptly due to a short-circuit accident of the exciting coil 4, it is possible to prevent a dangerous state such as the breakage of headlight bulbs, etc. from being caused by the overvoltage.

(6) As a protective measure against an accident where an abnormally high voltage is impressed on one of the output terminals F, L$_2$ and L$_1$ when the corresponding one of the first, second and third driver circuits 51, 52 and 53 is in operation, it is possible to render the corresponding one of the switching circuits 35, 37 and 39 in the respective driver circuits inoperative thereby to protect the elements in the switching circuits against such an accident.

(7) It is possible to compensate a battery charging voltage for temperature variations so that it may have an optimum mutual relation by correcting a reference voltage to be compared with the battery charing voltage to take a suitable value in response to temperatures of an electrolyte in the battery.

In general, the build-up of a voltage generated by the generator 1 is determined by the product of an exciting current (an exciting magnetic flux) and the number of revolutions per unit time of the generator 1. So far as the oscillation signal has a fixed period, the higher the duty factor is, the greater becomes the average value of the exciting current and the lower becomes the build-up rotational speed. Therefore, a higher duty factor is effective in reducing the build-up rotational speed, but, on the other hand, it causes an increased amount of discharge of the battery because of the increased exciting current when a driver fails to switch off the key switch 7. Accordingly, the condition of oscillation of the triangular waveform generator circuit 27 should be determined optionally in accordance with the presetting or requirements of the build-up rotational speed of the generator 1, the rising characteristic of an exciting current, etc.

Here, the triangular waveform generator circuit 27 used in this invention is not limited to an electric circuit for generating a triangular waveform voltage in the strict sense of the word, but may be any electric circuit so long as it generates a voltage having a fixed waveform which always increase or decrease regularly at constant periods. For example, it may be an electric circuit which generates a voltage of an exponential waveform by utilizing charge and discharge of a capacitor, or one which generates a voltage of a stepped waveform by using the output signal of an electronic counter circuit.

In the embodiment shown in FIG. 4, the relation of the duty factor D versus the regulated voltage or battery charging voltage V$_{reg}$ has been preset especially to be linear. However, taking into consideration that the characteristic of the relation of the exciting current versus the generated voltage of the generator 1 is of a cubic function, it is possible to attain more effective control of electric generation by changing the inclined portion of the waveform of the triangular waveform voltage to a cubic curve, thereby presetting the relation of the duty factor D versus the regulated voltage V$_{reg}$ to be a cubic function.

As other examples of the embodiment of this invention, the electric generation detecting circuit 23 may detect a state of electric generation by detecting the output of the armature winding 3 or that of the rectifier 2 other than by the detection of the neutral point voltage of the generator 1. Here, the time when the build-up of a generated voltage is completed corresponds, in general, to the time when the rotational speed of the engine has exceeded its idling rotational speed (600–900 RPM) after the engine has started rotating. Such a time may be determined by taking into consideration the magnitude of an initial exciting current, the state of magnetization of the rotor of the generator 1, etc. Therefore, it may also be possible to detect the state of electric generation indirectly by the rotational speed of the engine, etc.

Further, the time of switching-on of the key switch 7 is generally understood as the time at which a driver has electrically connected an ignition terminal of the key switch 7 to a battery terminal thereof. In this invention, however, the time of switching-on of the key switch 7 is not necessarily limited to the above-mentioned situation, but it also includes the time when a driver has electrically connected an accessory terminal or a starter terminal of the key switch 7 to the battery terminal thereof.

Further, in the above-described embodiment of this invention, the indication of the results of the electric generation detection and the overvoltage detection is effected to enable the discrimination of both states from each other, namely, by the simple lighting of an indicating lamp in the former and by the flashing operation of an indicating lamp in the latter. However, the above-mentioned object may be accomplished by other means, for example, by switching the flashing frequency of an indicating lamp, or by making use of different indicating elements such as a liquid crystal, a PLZT element (a ceramic element having an electrophotoluminescence effect), etc. other than an incandescent lamp and by switching an applied voltage (current) in response to both states as mentioned above thereby to vary an indicating colour of each of such indicating elements.

As described above, the overvoltage detecting circuit 28 detects the state of overvoltage of a generated voltage or a battery voltage. The state of overvoltage represents a case where a voltage which overchanges the battery appears, and also a case where there occurs a voltage having a high value which is undesirable for various electric loads, especially, electronic circuits, connected to the terminal of the battery.

As is apparent from the foregoing descriptions, this invention provides a voltage control apparatus for electric generators for vehicles wherein the initial excitation circuit generates an oscillation signal for the purpose of initial excitation during a time interval from the switching-on of the key switch to the arrival of the electric generator at a predetermined condition of electric generation and supplies the oscillation signal to the driver circuit and thereby makes the driver circuit supply an initial exciting current to the exciliting coil, then, after the above-mentioned time interval, the differential amplifier circuit forms a detected voltage corresponding to a difference between a reference voltage and a generated voltage or a battery charging voltage, the triangular waveform generator circuit forms a triangular waveform voltage oscillating with a predetermined voltage swing and at constant periods, and a comparison signal obtained by the magnitude comparison between the above-mentioned detected voltage and the triangular waveform voltage is supplied to the driver circuit, thereby continuously controlling the exciting condition of the electric generator depending on the relation between the above-mentioned two voltage signals and taking the response characteristic of the control system into consideration. The above-described construction of the voltage control apparatus of this invention brings excellent advantages such that an initial exciting current can be limited without using any conventional initial exciting current limiting power resistor, whereby a discharge current can be reduced and overdischarge of the battery can be prevented when a driver has failed to switch off the key switch, and a generated voltage (or a battery charging voltage) can be monitored and controlled always at constant periods without being affected by variations of the rotational speed of the electric generator and a generated voltage (a battery charging voltage), and hence this voltage control apparatus can be free from a response delay which is incidental to an electric generation control system and also enables high precision voltage control even when the electric generator is operating at low rotational speeds or under a light load. Further, since this invention renders the use of a power resistor unnecessary, it is possible to make assembly work easy and to design electric circuits which can be conveniently fabricated with IC's.

We claim:

1. A voltage control apparatus for electric generators for vehicles comprising:
    an electric generator having an armature winding, an exciting coil and a rectifier for rectifying an a.c. output from said armature winding;
    a battery charged by a d.c. output from said rectifier;
    a voltage detecting circuit detecting a generated voltage of said electric generator or a charging voltage of said battery and producing an output detected voltage;
    a reference voltage circuit for generating a reference voltage representing a desired value for a battery voltage to be regulated;
    a differential amplifier circuit receiving the output detected voltage from said voltage detecting circuit and the reference voltage from said reference voltage circuit as input signals thereto and producing a difference voltage obtained by difference amplification;
    a triangular waveform generator circuit generating a triangular waveform voltage within a predetermined range of swing and at constant periods;
    a comparator circuit receiving the difference voltage from said differential amplifier circuit and the triangular waveform voltage from said triangular waveform generator circuit, comparing the two voltages with each other, and producing an output signal;
    a first driver circuit for energizing said exciting coil in response to the output signal from said comparator circuit; and
    an initial excitation circuit for forcibly causing an oscillation signal for initial excitation to be generated and supplying the oscillation signal to said first driver circuit to make said first driver circuit supply an initial exciting current to said exciting coil during a time interval from the start of said electric generator to the arrival thereof at a predetermined condition of electric generation.

2. A voltage control apparatus for electric generators for vehicles according to claim 1, wherein the difference voltage from said differential amplifier circuit increases or decreases from the reference voltage depending on the relative magnitude of the battery charging voltage and the desired value for a battery voltage to be regulated.

3. A voltage control apparatus for electric generators for vehicles according to claim 1, wherein the magnitude of the difference voltage from said differential amplifier circuit becomes equal to a minimum value and a maximum value of said triangular waveform voltage within the range of voltage regulation of $\pm 1.3\%-2.1\%$ of a battery charging voltage taken on the basis of the desired value for a battery voltage to be regulated, respectively.

4. A voltage control apparatus for electric generators for vehicles according to claim 1, further comprising an overvoltage detecting circuit for detecting the occurrence of an overvoltage, which exceeds a predetermined voltage, and producing an overvoltage detection signal.

5. A voltage control apparatus for electric generators for vehicles according to claim 1, wherein said first driver circuit comprises a first switching circuit having an output terminal connected to said exciting coil and operating to switch an exciting current supplied to said exciting coil and a first protective circuit for detecting the appearance of an abnormal high voltage at the output terminal of said first switching circuit to render said first switching circuit inoperative.

6. A voltage control apparatus for electric generators for vehicles according to claim 4, wherein said first driver circuit comprises a first switching circuit having an output terminal connected to said exciting coil and operating to switch an exciting current supplied to said exciting coil and a first protective circuit for rendering said first switching circuit inoperative upon detection of the appearance of an abnormal high voltage at the output terminal of said first switching circuit or upon receipt of the overvoltage detection signal from said overvoltage detecting circuit.

7. A voltage control apparatus for electric generators for vehicles according to claim 1, further comprising a battery temperature detecting device for detecting temperatures of said battery and producing a battery temperature detection signal and a temperature compensation circuit receiving the battery temperature detection signal from said battery temperature detecting device and producing a battery temperature compensation voltage for modifying the reference voltage generated by said reference voltage circuit.

8. A voltage control apparatus for electric generators for vehicles according to claim 4, further comprising a third driver circuit for driving indicating means to indicate whether an initial generated voltage of said electric generator by initial excitation of said exciting coil has reached a predetermined value and to warn a driver of the generation of an overvoltage by said electric generator when said overvoltage detecting circuit has produced the overvoltage detection signal.

9. A voltage control apparatus for electric generators for vehicles according to claim 1 or 8, further comprising a second driver circuit having an external output terminal producing an electrical output whose electric potential takes a low level or a high level depending on whether an initial generated voltage of said electric generator by initial excitation of said exciting coil has reached a predetermined value.

10. A voltage control apparatus for electric generators for vehicles according to claim 8, wherein said third driver circuit has an external output terminal and comprises a third switching circuit whose output is connected to the external output terminal of said third driver circuit and a third protective circuit for detecting the appearance of an abnormal high voltage at the external output terminal of said third driver circuit to render said third switching circuit inoperative.

11. A voltage control apparatus for electric generators for vehicles according to claim 9, wherein said second driver circuit has an external output terminal and comprises a second switching circuit whose output is connected to the external output terminal of said second driver circuit and a second protective circuit for detecting the appearance of an abnormal high voltage at the external output terminal of said second driver circuit to render said second switching circuit inoperative.

* * * * *